US009467346B2

(12) United States Patent
Pinto et al.

(10) Patent No.: US 9,467,346 B2
(45) Date of Patent: *Oct. 11, 2016

(54) INTERPRETING A GESTURE-BASED INSTRUCTION TO SELECTIVELY DISPLAY A FRAME OF AN APPLICATION USER INTERFACE ON A MOBILE COMPUTING DEVICE

(71) Applicant: Citrix Systems, Inc., Fort Lauderdale, FL (US)

(72) Inventors: Gus Pinto, Boca Raton, FL (US); Adam Marano, Parkland, FL (US); Ruiguo Yang, Parkland, FL (US); Christopher Fleck, Boca Raton, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 373 days.

This patent is subject to a terminal disclaimer.

(21) Appl. No.: 14/249,850

(22) Filed: Apr. 10, 2014

(65) Prior Publication Data

US 2014/0223314 A1    Aug. 7, 2014

Related U.S. Application Data

(63) Continuation of application No. 13/108,836, filed on May 16, 2011, now Pat. No. 8,730,269.

(60) Provisional application No. 61/334,646, filed on May 14, 2010.

(51) Int. Cl.
*G09G 5/00* (2006.01)
*H04L 12/24* (2006.01)
(Continued)

(52) U.S. Cl.
CPC ............ *H04L 41/22* (2013.01); *G06F 1/1694* (2013.01); *G06F 3/0484* (2013.01); *G06F 3/0485* (2013.01); *G06F 3/04883* (2013.01); *G06F 2203/04808* (2013.01); *H04M 1/72552* (2013.01); *H04M 1/72561* (2013.01); *H04M 2250/22* (2013.01)

(58) Field of Classification Search
None
See application file for complete search history.

(56) References Cited

U.S. PATENT DOCUMENTS 4,670,745 A * 6/1987 O'Malley ................ G09G 5/18
345/559
5,841,435 A    11/1998 Dauerer et al.
(Continued)

OTHER PUBLICATIONS

Notice of Allowance on U.S. Appl. No. 13/108,836 dated Jan. 16, 2014.
(Continued)

*Primary Examiner* — Phi Hoang
(74) *Attorney, Agent, or Firm* — Foley & Lardner LLP; John D. Lanza

(57) ABSTRACT

In general overview, the present disclosure is directed to a system and method for selectively displaying a frame of an application user interface on a mobile computing device. A user interface analyzer on a mobile computing device analyzes a user interface for an application executing on a remote server. The user interface analyzer identifies frames in the user interface, the positions of the frames, relationships between frames, and horizontal and vertical panning offsets to move between adjacent frames. The mobile computing device receives a user input requesting the display of an adjacent frame. Based on the information the user interface analyzer obtained, the mobile computing device displays an adjacent frame of the user interface.

18 Claims, 12 Drawing Sheets

(51) Int. Cl.
 *G06F 1/16* (2006.01)
 *G06F 3/0485* (2013.01)
 *G06F 3/0488* (2013.01)
 *G06F 3/0484* (2013.01)
 *H04M 1/725* (2006.01)

(56) References Cited

U.S. PATENT DOCUMENTS

2009/0284442 A1 11/2009 Pagan
2009/0319947 A1 12/2009 Wang et al.
2010/0115434 A1* 5/2010 Yagi .................. G06F 8/38
 715/763
2010/0231533 A1 9/2010 Chaudhri
2010/0269039 A1* 10/2010 Pahlavan ............ G06F 3/0481
 715/702
2011/0246904 A1 10/2011 Pinto et al.

OTHER PUBLICATIONS

Office Action on U.S. Appl. No. 13/108,836 dated Jan. 16, 2013.
Office Action on U.S. Appl. No. 13/108,836 dated Jun. 6, 2013.

* cited by examiner

INTERPRETING A GESTURE-BASED INSTRUCTION TO SELECTIVELY DISPLAY A FRAME OF AN APPLICATION USER INTERFACE ON A MOBILE COMPUTING DEVICE

CROSS-REFERENCE TO RELATED APPLICATIONS

This application is a continuation of U.S. patent application Ser. No. 13/108,836, filed on May 16, 2011, now allowed, which claims priority to U.S. Provisional Application No. 61/334,646, entitled "Interpreting a Gesture-Based Instruction to Selectively Display a Frame of an Application User Interface on a Mobile Computing Device," filed on May 14, 2010, The entire disclosure of each of the foregoing applications are incorporated herein by reference in their entireties for any and all purposes.

FIELD OF THE INVENTION

The present disclosure relates generally to selectively displaying on a mobile computing device a frame of an application user interface of an application executing remotely on a server. In particular, the present disclosure is directed to interpreting a gesture-based or customized instruction to view an adjacent frame of the application user interface and panning the native display of the mobile computing device to the new frame.

BACKGROUND OF THE INVENTION

Remote access systems have enabled users to access applications on servers from various portals. With the increasing prevalence of mobile computing devices, users can also access applications on those servers from handheld devices. However, displays on such devices often have low resolution. As a result, a user can view only a section of the application user interface on the mobile computing device's screen, and the user must scroll around the interface to view other sections of the interface. Thus, navigating within an application user interface can be a cumbersome process.

It is common for many applications to have user interfaces that consist of multiple panes or frames of information in a single presentation or view. Often, a particular type of data or controls feature is grouped together in a frame of the user interface, such as emails in Microsoft Outlook. On devices that have larger screens, all of the frames may be displayed at the same time. However, when user interface (UI) designs with multiple frames or panes are delivered to a mobile device with a significantly smaller screen, the user will often be limited to a reduced view of all the frames or panes or must view an arbitrarily displayed limited view of the UI, making it hard for the user to navigate between the different frames. In some instances, the user must manually align the frame they wish to interact with on the devices screen, which can be a tedious interaction given the sensitivity of some mobile device's operation.

SUMMARY OF THE INVENTION

The present disclosure is directed to a system and method for selectively displaying a frame of an application user interface on a mobile computing device. A user interface analyzer on a mobile computing device analyzes a user interface for an application executing on a remote server. The user interface analyzer identifies frames in the user interface, the positions of the frames, relationships between frames, and horizontal and vertical panning offsets to move between adjacent frames. The mobile computing device receives a user input requesting the display of an adjacent frame. Based on the information the user interface analyzer obtained, the mobile computing device displays an adjacent frame of the user interface.

The systems and methods described herein increase the usability of applications with multiple frame by providing the means to smartly manage the locations of the different frames on the application UI and a user interface to easily navigate between the different frames. Users can perform the associated gesture or operation on their mobile devices to automatically align the application frame with the devices screen, eliminating the need for the user to manually align the application frame with the device's screen.

The systems and methods described herein may provide easier navigation of static-sized UI frames and easy navigation to UI frames of different sizes to either the frame's offset or middle of the frame, including zooming a frame in or out to better align with the device's screen. The systems and methods described herein may provide tagged frame navigation which include embedding jump tags into the UI that allow the system to dynamically jump to specified frames. Guidelines may be provided for formatting application UIs using static sized UI frames to be compatible with the systems and methods described herein. Tagging and coding guidelines may be provided to allow the application to leverage the system. APIs may be provided that can be used in the development of the application to leverage more dynamic interaction with the system. APIs may be provided that will allow mobile devices to define the gestures/actions to be used to invoke the features of the invention related to how the application UI is positioned on the screen of the device.

In one aspect, the present invention is directed to a method for selectively displaying a frame of an application user interface on a mobile computing device. A client agent of a mobile computing device receives an application user interface from an application executing remotely on a server. The client agent stores the application user interface to an extended virtual screen buffer maintained by the mobile computing device. The client agent displays, on a native display of the mobile computing device, a frame of the extended virtual screen buffer. The client agent interprets user input from a user as a request to view an adjacent frame of the application user interface. The client agent, responsive to the request, retrieves the adjacent frame and the position of the adjacent frame of the application user interface from the extended virtual screen buffer. The client agent displays the retrieved adjacent frame of the extended virtual screen buffer on the native display of the mobile computing device.

In some embodiments, the client agent receives user input from the user via a touch screen of the native display. In some embodiments, the client agent identifies a plurality of frames of the received application user interface. In some further embodiments, the client agent identifies coordinates of each of the plurality of frames of the received application user interface on the extended virtual screen buffer. In some embodiments, the client agent identifies panning offsets of each of the plurality of frames of the received application user interface on the extended virtual screen buffer. In some embodiments, the client agent detects jump tags associated with each of the plurality of frames, wherein each jump tag identifies a command to execute to display a frame if a user inputs the command. In some embodiments, the client agent interprets the user input from the user a vertical swipe as the request to view an adjacent frame of the application user interface as one of above or below the displayed frame. The client agent applies an object recognition algorithm to the extended virtual screen buffer to identify the plurality of frames of the received application user interface. In some embodiments, the client agent determines to apply a zoom operation to the frame displayed on the native display of the mobile computing device. In some embodiments, the client agent determines dimensions of each of the plurality of frames of the application user interface.

In one aspect, the present invention is directed to a system for selectively displaying a frame of an application user interface on a mobile computing device. In some embodiments, the system includes a mobile computing device, a server, an application executing remotely on the server, and a client agent executing on a mobile computing device. The client agent receives an application user interface from the application. The client agent stores the application user interface to an extended virtual screen buffer maintained by the mobile computing device. The client agent displays on a native display of the mobile computing device a frame of the extended virtual screen buffer. The client agent interprets user input from a user as a request to view an adjacent frame of the application user interface. The client agent retrieves, responsive to the request, the adjacent frame and the position of the adjacent frame of the application user interface from the extended virtual screen buffer. The client agent displays the retrieved adjacent frame of the extended virtual screen buffer on the native display of the mobile computing device.

In some embodiments, the client agent receives user input from the user via a touch screen of the native display. In some embodiments, the client agent identifies a plurality of frames of the received application user interface. In some embodiments, the client agent identifies coordinates of each of the plurality of frames of the received application user interface on the extended virtual screen buffer. In some embodiments, the client agent identifies panning offsets of each of the plurality of frames of the received application user interface on the extended virtual screen buffer. In some embodiments, the client agent detects jump tags associated with each of the plurality of frames, wherein each jump tag identifies a command to execute to display a frame if a user inputs the command. In some embodiments, the client agent interprets the user input from the user a vertical swipe as the request to view an adjacent frame of the application user interface as one of above or below the displayed frame. In some embodiments, the client agent applies an object recognition algorithm to the extended virtual screen buffer to identify the plurality of frames of the received application user interface. In some embodiments, the client agent determines to apply a zoom operation to the frame displayed on the native display of the mobile computing device. In some embodiments, the client agent determines dimensions of each of the plurality of frames of the application user interface.

The details of various embodiments of the methods and systems described herein are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems for interpreting a gesture-based instruction to selectively display a frame of an application user interface on a mobile computing device; and Section C describes embodiments of methods for interpreting a gesture-based instruction to selectively display a frame of an application user interface on a mobile computing device.

In general overview, the present disclosure is directed to selectively displaying a frame of an application user interface on the native display of a mobile computing device. The application can publish a user interface with frames that group types of data and/or control features. A mobile computing device determines how to pan between adjacent frames of the interface. When the mobile computing device receives a user input requesting the display of an adjacent frame, the mobile computing device pans to the adjacent frame.

Section A: Network and Computing Environment

Figure 1A:
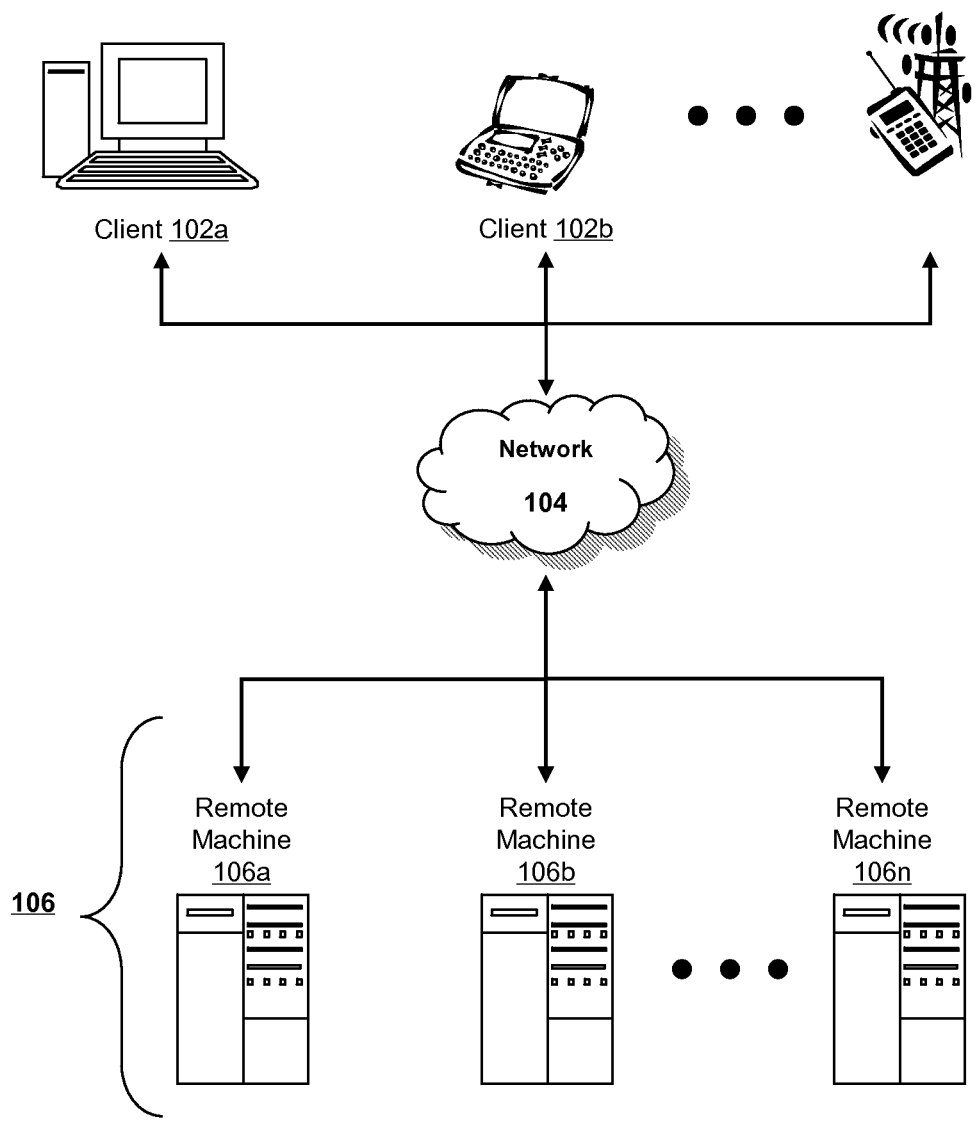
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers.

The client machine(s) 102 can, in some embodiments, be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. In some embodiments, the virtual machine 102C can be managed by a hypervisor such as the Xen hypervisor, developed sold by Citrix Systems, Inc., Hyper-V, developed and sold by Microsoft Corp., ESX, developed and sold by EMC, or any other hypervisor.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the XENAPP or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; EV-DO; LTE; or any other protocol able to transmit data among mobile devices like 802.11, Bluetooth, and Near Field Communication.

Figure 1B:
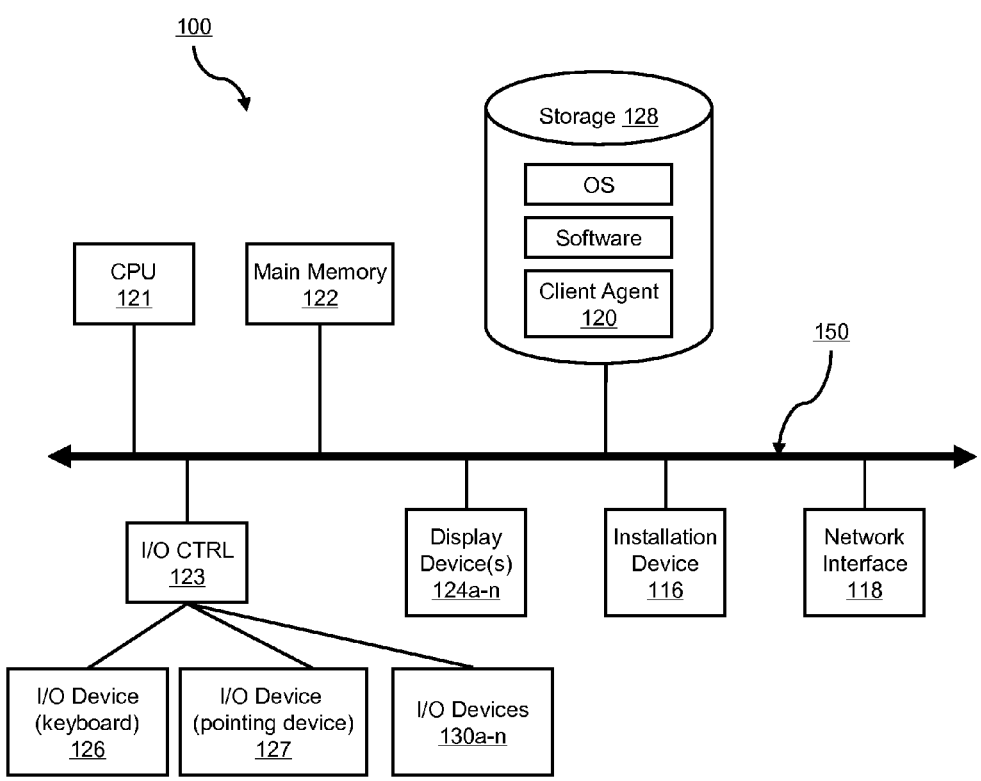
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
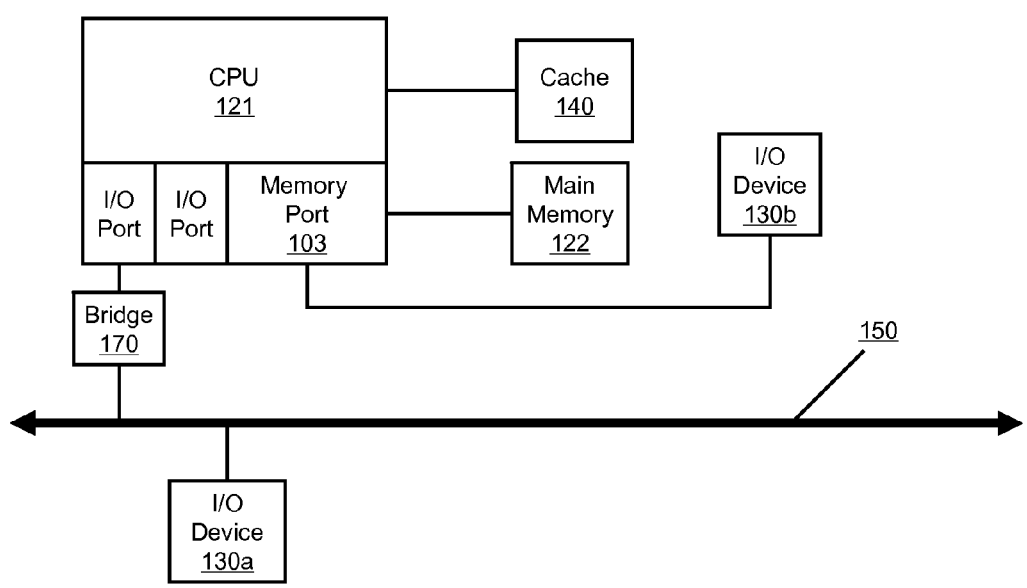

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics-processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; an AGP bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); Memristor based memory; or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, a USB device, Secure Digital card, NetBoot or iPXE firmware, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-

124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

Figure 2A:
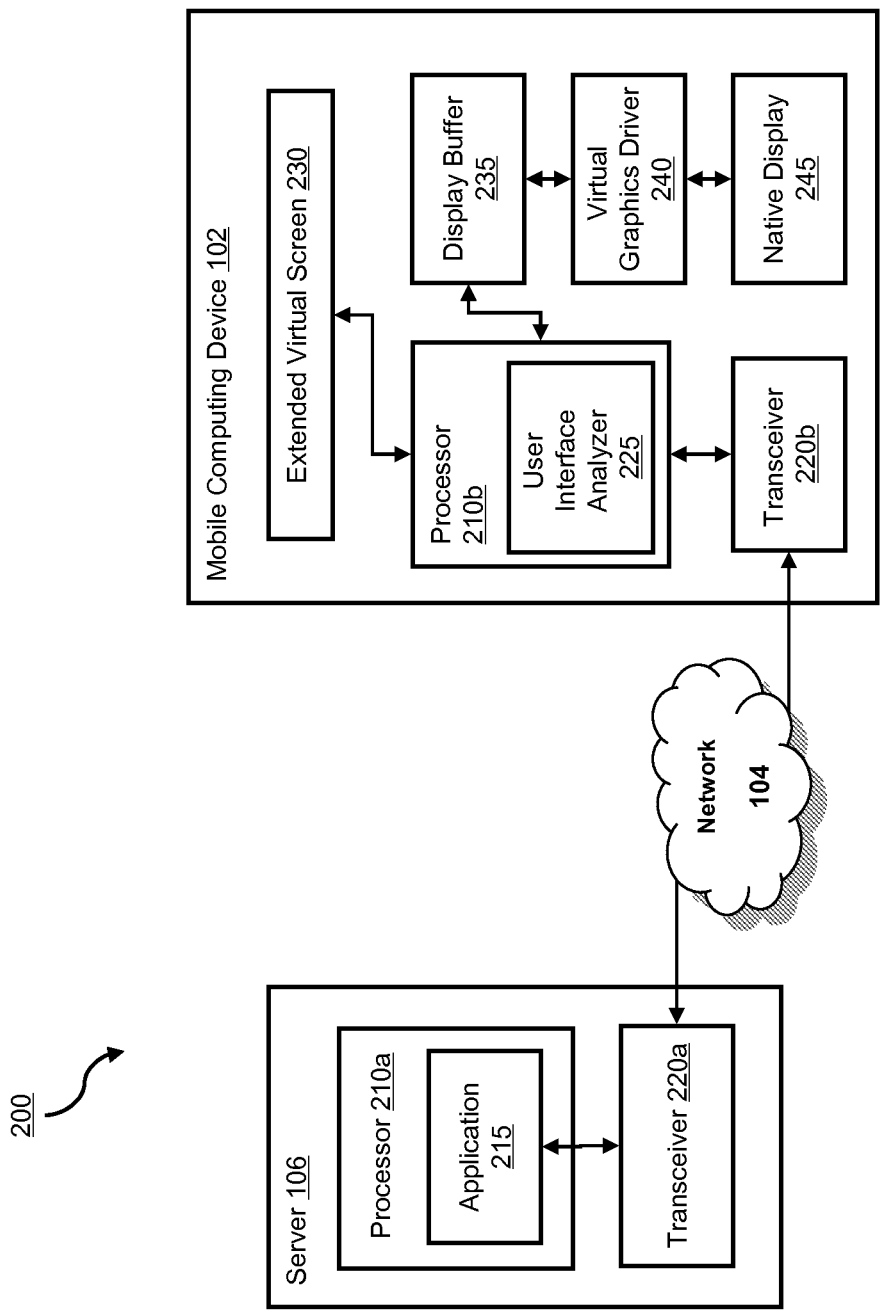
FIG. 2A is a block diagram of an exemplary system for selectively displaying a frame of an application user interface on a mobile computing device, wherein the application executes on a remote server.

Section B: Systems for Interpreting a Gesture-Based Instruction to Selectively Display a Frame of an Application User Interface on a Mobile Computing Device Referring to FIG. 2A, a block diagram illustrating an exemplary system for selectively displaying a frame of an application user interface on a mobile computing device is shown and described. In brief overview, the system 200 includes a server 106 that communicates with a mobile computing device 102 over a network 104. The processor 210a of the server 106 executes an application 215, and the server 106 transmits output data (also referred to herein as the "user interface" or "application user interface") of the application 215 to the mobile computing device 102 via the transceiver 220a.

The mobile computing device 102 receives the application user interface via transceiver 220b and stores the application user interface on an extended virtual screen 230. A processor 210b loads a section of the extended virtual screen 230 into a display buffer 235 and the virtual graphics driver 240 transmits this section to the native display 245. A user interface analyzer 225 (also referred to herein as a "client agent") executed by the processor 210 processes the application user interface to identify the interface's frames, coordinates corresponding to the frames' positions on the extended virtual screen, the relationships between the frames' positions, and/or the offsets to pan from one frame to another (also referred to herein as "panning offsets"). In some embodiments, the user interface analyzer 225 detects jump tags associated with the frames, each jump tag identifying a command and a new frame to display if a user inputs the command when the jump tag's frame is on display.

The mobile computing device 102 receives a user input via, for example, a touchscreen of the native display 245. The mobile computing device 102 interprets the user input as a request to view an adjacent frame of the application user interface. Based on the information about the user interface and the user input, the mobile computing device 102 identifies a new frame for display and the new frame's position on the extended virtual screen 230. The processor 210 loads the section of the extended virtual screen 230 corresponding to the new frame into the display buffer 235. The virtual graphics driver 240 transmits the new frame to the native display 245.

Figure 2B:
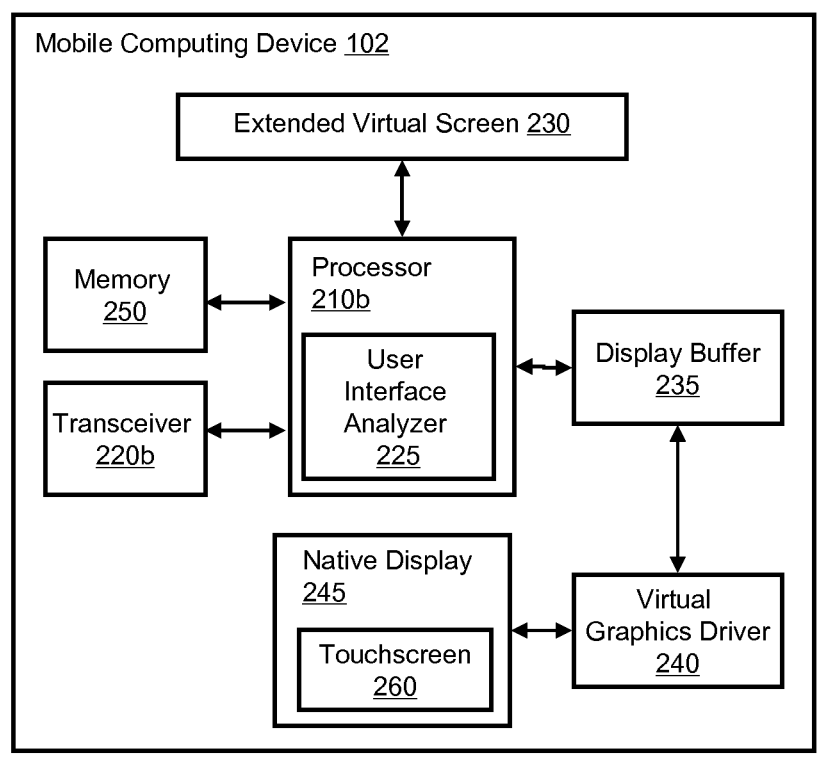
FIG. 2B is a block diagram of an exemplary mobile computing device that selectively displays a frame of an application user interface.

Referring now to FIG. 2B, a block diagram of an exemplary mobile computing device 102 that selectively displays a frame of an application user interface is shown and described. The mobile computing device 102 stores the application user interface from the server 106 on an extended virtual screen 230. The user interface analyzer 225 processes the application user interface to identify the interface's frames, the frames' positions, the relationships between the frames' positions, and/or the offsets to pan from one frame to another.

The user interface analyzer 225 can process the user interface to identify frames according to numerous methods. In some embodiments, the user interface analyzer 225 identifies the frames by scraping the extended virtual screen 230. For example, the user interface analyzer 225 can detect frames by applying an object recognition algorithm on the data in the extended virtual screen 230. In another example, the user interface analyzer 225 queries the underlying programming objects on the server 106 that are associated with the application user interface for information about the frames.

Through such methods, the user interface analyzer 225 can determine the position of each frame on the extended virtual screen 230. The representation of the position can correspond to how the mobile computing device 102 displays frames. For example, if the position is represented by coordinates corresponding to a corner of a frame or the four corners of the frame, the mobile computing device 102 can match a corner of the frame with a corner of the native display 245. Thus, a mobile computing device 102 can align a frame against two of the boundaries of the native display. In another example, if the position is represented by coordinates corresponding to the center of the frame, the mobile computing device 102 can positions the frame in the center of the native display 245.

The user interface analyzer 225 can also determine the dimensions of each frame. The dimensions can be represented by the number of pixels in the length and width of the frame, e.g., 320×480 pixels. In some embodiments, the user interface analyzer 225 also identifies the orientation of the frame. For example, the user interface analyzer 225 can assign a "landscape" orientation to a 480×320 pixel frame and a "portrait" orientation to a 320×480 pixel frame, thereby indicating how to display the frame to match the dimensions of the native display 245. The user interface analyzer 225 can store the positions, dimensions, and/or orientation of the frames in memory 250.

In some embodiments, the user interface analyzer 225 can determine if a zoom operation should be applied to a frame upon display. The user interface analyzer 225 can compare the dimensions of a frame with the resolution of the native display 245. If the dimensions exceed the display resolution, the user interface analyzer 225 can store an instruction to zoom out for the frame. The instruction can indicate the magnitude of the zoom and the algorithm to produce the zoom. For example, an instruction can include a rate for subsampling a frame. Likewise, if the display resolution exceeds the dimensions of the frame, the user interface analyzer 225 can store an instruction to zoom in for the frame. Such an instruction can include the parameters for performing nearest-neighbor interpolation, bilinear interpolation, bicubic interpolation, or any other upsampling algorithm as would be appreciated by one of ordinary skill in the art. Any of these instructions can be stored in memory 250 in association with the relevant frame.

Further, the user interface analyzer 225 can determine the relationships between the frames' positions and/or the offsets to pan from one frame to another. For example, the user interface analyzer 225 can compare the positions and/or dimensions of frames to determine which frames are vertically or horizontally adjacent to one another. By iteratively comparing positions and/or dimensions of the frames, the user interface analyzer 225 can construct the arrangement of frames in the application user interface.

In some embodiments, the user interface analyzer 225 can detect that the frames are equally sized and spaced (i.e., a static-sized user interface). When this occurs, whenever the device 102 pans to an adjacent frame, the processor 210*b* can add or subtract the same horizontal and vertical panning offsets to the coordinates corresponding to the frame on the native display. Thus, the mobile computing device 102 can derive global horizontal and vertical panning offsets according to the sizing and spacing of the frames.

The user interface analyzer 225 can match the arrangement of frames with a grid template stored in memory 250. When the user interface analyzer 225 can make a match, the user interface analyzer 225 can adopt the horizontal and vertical panning offsets provided by the grid template. In some embodiments, the mobile computing device 102 receives from the server 106 the identity of a grid template corresponding to the application user interface. The user interface analyzer 225 can adopt the panning offsets of the identified grid template. Thus, the mobile computing device 102 can forgo calculating the panning offsets.

The grid templates can correspond to common arrangements of frames designed for display on mobile computing devices 102. In some embodiments, development guidelines for applications to be used with the present disclosure can publish the grid templates. Based on the guidelines, application developers can design applications that output user interfaces compatible with one of the grid templates stored on the mobile computing device 102. As the user interface analyzer 225 evaluates the application user interface, the user interface analyzer 225 can readily match the user interface with a grid template and forego additional calculations for determining panning offsets.

In some embodiments, when the arrangement of frames is incompatible with the grid templates, the user interface analyzer 225 evaluates the relationships between frames to determine offsets for panning between frames. For example, the user interface analyzer 225 can assign identifiers to the frames. For each frame, the user interface analyzer 225 can identify adjacent frames and associate the identifiers of the adjacent frames with the frame. The user interface analyzer 225 can calculate vertical and horizontal offsets for panning from the frame to each adjacent frame. For example, the user interface analyzer 225 can subtract the coordinates of the frame from the coordinates of an adjacent frame. Based on the polarity of the differences, the user interface analyzer 225 can determine the relative position of the adjacent frame (e.g., bordering the frame on the left, right, top, or bottom). The user interface analyzer 225 can store the identifiers of adjacent frames, the vertical and horizontal offsets for panning to those frames, and the relative positions of the frames in the memory 250.

Further, the user interface analyzer 225 can evaluate jump tags associated with the frames of the user interface. The user interface analyzer 225 can extract a command and a new frame to display if a user inputs the command when the jump tag's frame is on display. In some embodiments, the jump tag includes the vertical and horizontal offsets for panning from the jump tag's frame to the new frame. In other embodiments, the user interface analyzer 225 calculates the offsets by subtracting the coordinates of the jump tag's frame from the coordinates of the new frame. The user interface analyzer 225 stores the offsets in association with the jump tag's frame. When a user inputs the command, the processor 210*b* retrieves the vertical and horizontal offsets of the new frame from memory and transfer data corresponding to the new frame to the display buffer 235.

As with the grid templates, development guidelines for applications to be used with the present disclosure can publish guidelines for associating jump tags with frames. Based on the guidelines, application developers can design applications that output user interfaces with frames that include jump tags for panning to designated frames when the mobile computing device 102 detects user inputs corresponding to the jump tags.

Additionally, the user interface analyzer 225 can include an application programming interface (API) that permits users to customize the user interface analyzer 225. In this manner, users can define the commands to view different frames of the application user interface. Through such customization, users can tailor the commands to the input interfaces of the mobile computing device 102, substitute their preferred commands for the user interface analyzer's 225 default commands, and/or create new commands.

For example, a user can create new commands for the mobile computing device 102 to pan to adjacent frames in response to tapping on the edges of the touchscreen 260, in addition to the default commands. If the mobile computing device 102 includes an accelerometer, the user can create commands to pan to an adjacent frame in the direction of a detected tilt. Further, a user can create a command to pan to a predetermined frame whenever the user shakes the mobile computing device 102. In additional examples, a user can create commands to change how the mobile computing device 102 displays each frame. The mobile computing device 102 can center a displayed frame in response to a double tap in the center of the touchscreen 260 or align the displayed frame against a corner of the touchscreen 260 in response to a double tap in that corner.

Although the present disclosure describes a user interface analyzer 225 on the mobile computing device 102 to analyze the application user interface, the server 106 can analyze the user interface. The server 106 can perform any of the operations described herein with respect to the user interface and transmit the information to the mobile computing device 102. For example, the server 106 can identify the frames, coordinates corresponding to the frames' positions on the extended virtual screen, the relationships between the frames' positions, and/or the offsets to pan from one frame to another. Then, the server 106 can transmit this information to the mobile computing device 102.

After the mobile computing device stores information about the application user interface, the mobile computing device 102 selects a frame for initial display. The processor 210*b* retrieves the coordinates of the frame from memory 250 and loads the section of the extended virtual screen 230 corresponding to the frame into the display buffer 235. The virtual graphics driver 240 transmits the data in the display buffer 235 to the native display 245.

A touch-responsive surface (also referred to herein as a "touchscreen" 260) of the native display 245 can receive a touch input from a user of the mobile computing device 102. The touchscreen 260 can identify the locations where the user touches the surface and transmit the locations to the processor 210*b*. The processor 210*b* can evaluate the locations to determine if the user input is a request to view an adjacent frame of the application user interface. For example, if the user input is a two finger swipe on the touchscreen 260, the processor 210 interprets the user input as a request to view an adjacent frame, not a request to pan across the extended virtual screen 230 based on the magnitude of the input.

The processor 210b evaluates the user input to determine the position of the adjacent frame. The processor 210b can compare the coordinates of the beginning and end of the user input. From this comparison, the processor 210b can interpret the user input as a request to view a frame to the left, right, top, or bottom of the frame on the native display. If the user interface analyzer 225 previously detected that the application user interface is static-sized, the processor 210b can calculate coordinates of the new frame by adjusting the coordinates of the displayed frame by the established global horizontal and/or vertical panning offsets. If the application user interface is compatible with a grid template, the processor 210b adjusts the coordinates according to the offsets indicated by the grid template.

In further embodiments, the processor 210b retrieves the information for the displayed frame and its adjacent frames from memory 250. When such information includes vertical and horizontal panning offsets to move from the displayed frame to adjacent frames, the processor 210b identifies the offsets for the adjacent frame in the direction indicated by the user input. The processor 210b adjusts the coordinates corresponding to the data in the display buffer by these offsets. The processor 210b outputs data corresponding to the new frame to the display buffer, adjusting the data for the new frame's orientation. When the information includes the identifiers of the adjacent frames, the processor 210b retrieves the coordinates corresponding to the identified adjacent frame in the direction indicated by the user input. The processor 210b outputs data corresponding to the retrieved coordinates to the display buffer according to the adjacent frame's orientation.

In any of these embodiments, the processor 210b can retrieve an instruction to apply a zoom operation to the new frame upon display. If a frame includes such an instruction, the processor 210b applies the zoom operation to the frame data on the extended virtual screen and outputs this data to the display buffer. If the frame does not include such an instruction, the processor 210b copies the frame data on the extended virtual screen 230 to the display buffer 235. Then, the virtual graphics driver 240 transmits the data in the display buffer 235 to the native display 245 to display the new frame.

In some embodiments, the mobile computing device 102 copies the frame data on the extended virtual screen 230 to the display buffer 235, regardless of stored zoom instructions for the frame. If the processor 210b interprets additional touch input received on the touchscreen 260 as an instruction to zoom, the processor 210b determines if the frame includes a zoom instruction corresponding to the input. The processor 210b applies the zoom instruction to the frame data and outputs this data to the frame buffer.

The operations for panning to a new frame can also be applied to any customized commands as defined by a user through the application programming interface (API). For example, the processor 210b can retrieve information for a frame adjacent to the displayed frame in response to a double tap on the edge of the touchscreen 260. Likewise, if the user creates a command to view different frames when the mobile computing device 102 is tilted, the processor 210b retrieves information for an adjacent frame in response to input from an accelerometer. In this manner, the processor 210b can obtain coordinates and/or zoom operations for a new frame in response to any user input indicated in a user-customized command.

Figure 3:
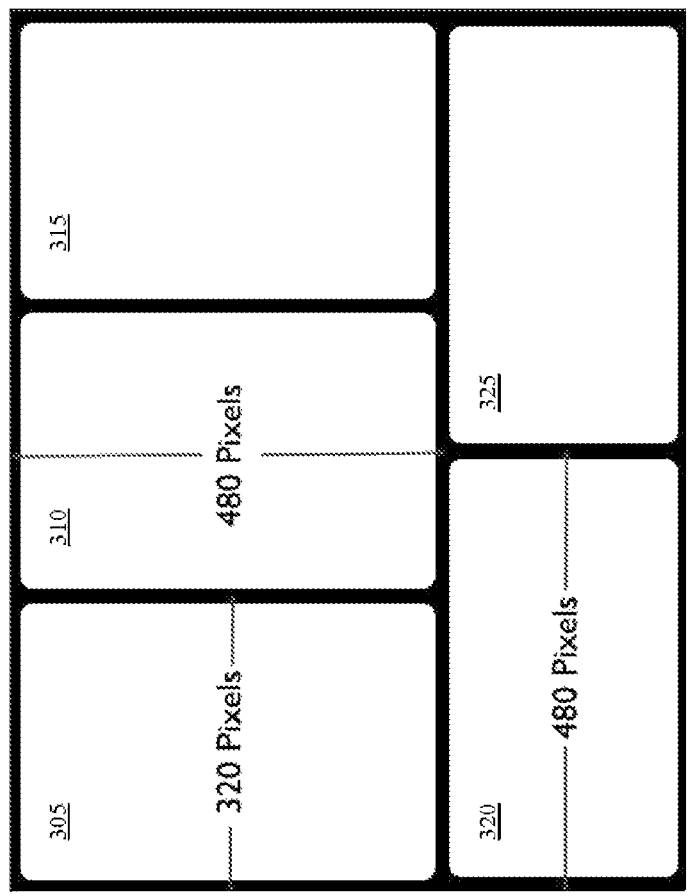
FIG. 3 is a grid depicting an exemplary arrangement of frames in an application user interface.

Referring now to FIG. 3, a grid depicting an exemplary arrangement of frames in an application user interface is shown and described. The grid includes three frames 305, 310, and 315 that are 320×480 pixels and two frames 320, 325, that are 480×320 pixels. Such a grid can include a horizontal panning offset of 320 pixels between frames 305 and 310 and frames 310 and 315. The grid can also include a horizontal panning offset of 480 pixels between frames 320 and 325. When a user instructs the mobile computing device 102 to display the frame below frame 305, the processor 210b can calculate the coordinates of frame 320 from the coordinates of frame 305 and the offset between the frames stored in memory. Additionally, the processor 210b can retrieve the orientation of frame 320. The processor 210b can use this orientation to output the data of frame 320 to the display buffer so the dimensions of the frame match the native display. In this manner, a user can simply rotate the mobile computing device 102 to view frame 320.

Figure 4:
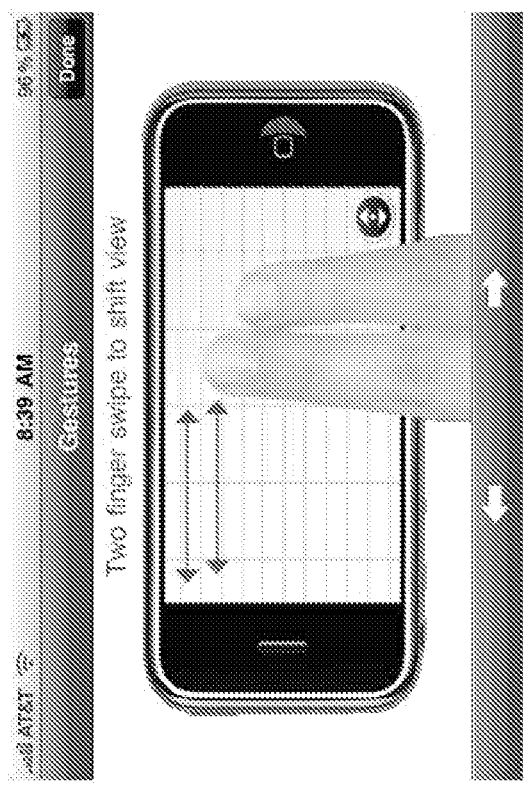
FIG. 4 depicts an exemplary gesture-based instruction for viewing an adjacent frame of an application user interface.

Referring now to FIG. 4, an exemplary gesture-based instruction for viewing a different frame of the application user interface is shown and described. In this embodiment, the gesture-based instruction is a two finger swipe across a touchscreen. The two finger swipe depicted can pan to adjacent frames to the left or right of the displayed frame.

Figure 5A:
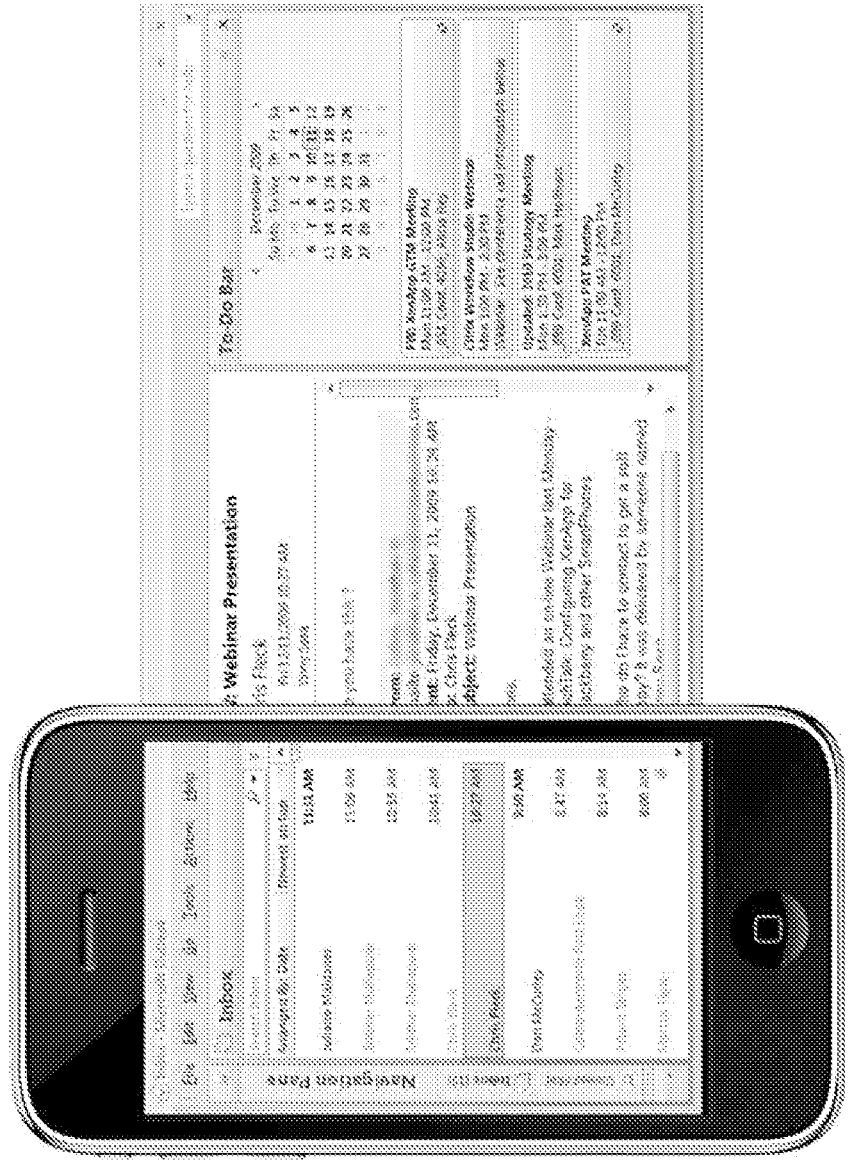
FIGS. 5A-5C are exemplary views of a mobile computing device selectively displaying frames of an application user interface in response to a gesture-based instruction.
Figure 5B:
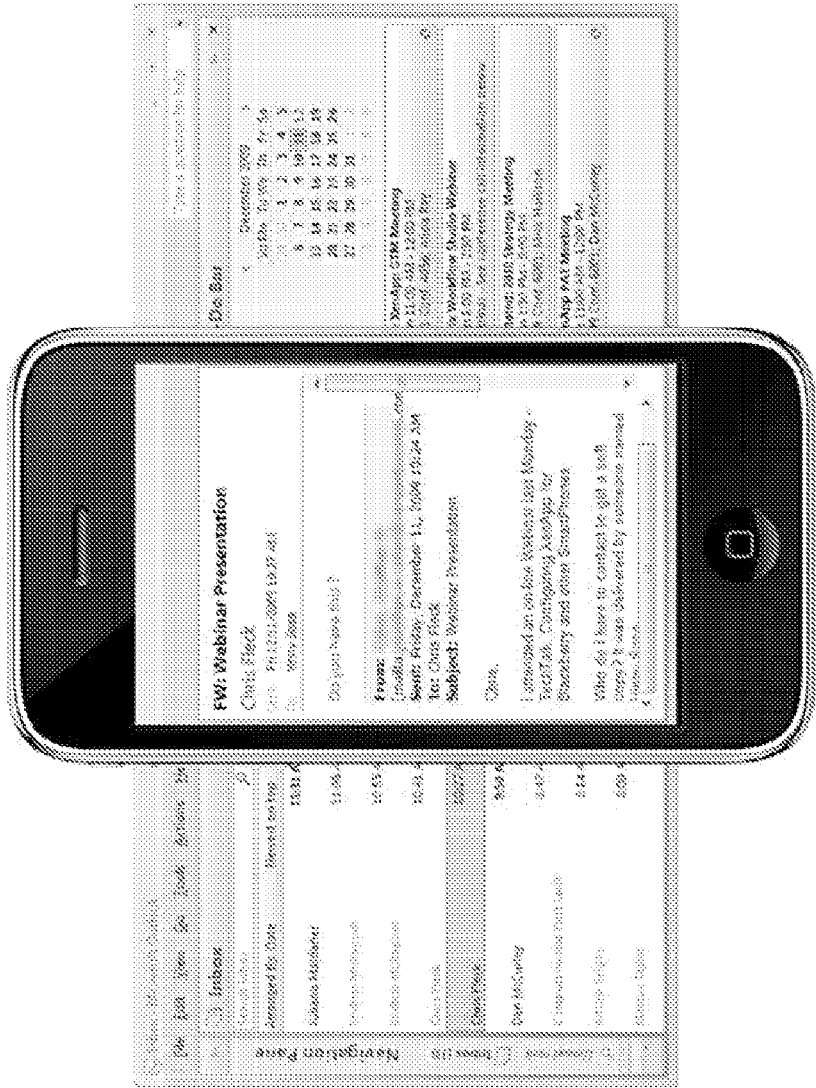
Figure 5C:
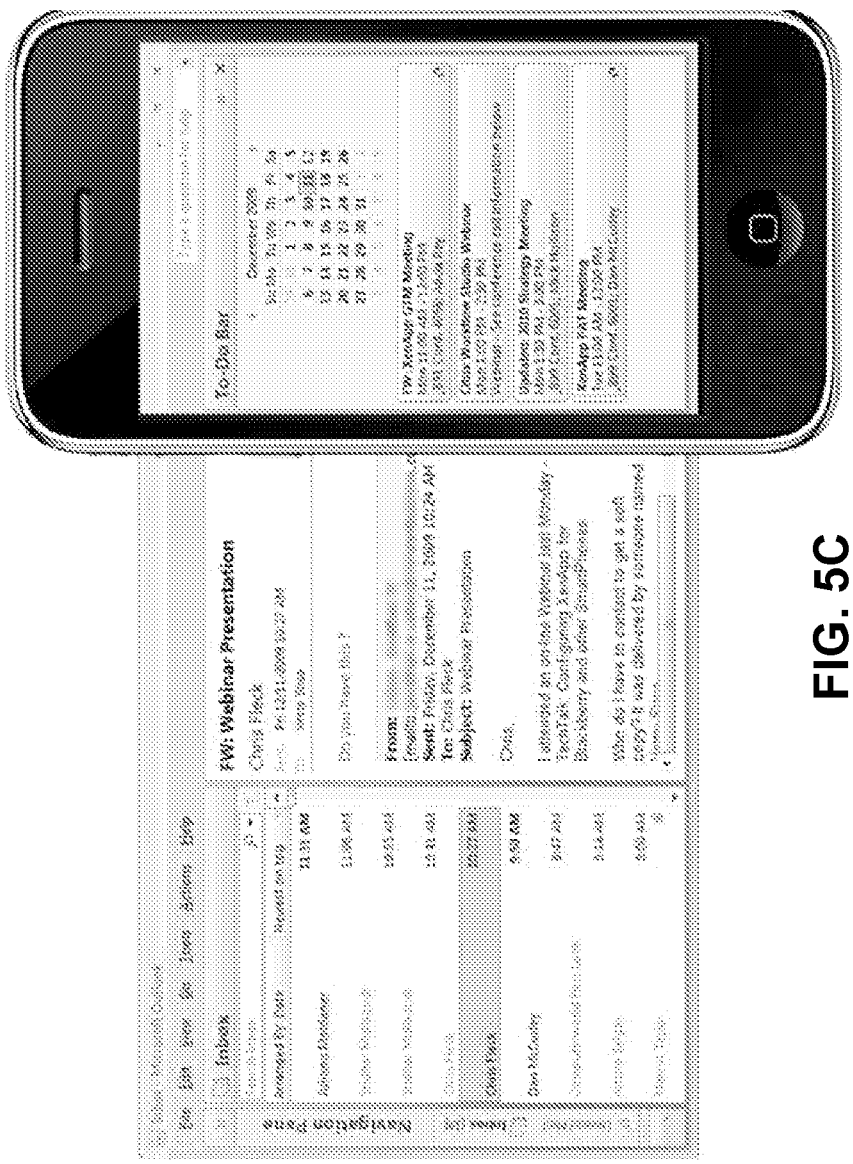

Referring now to FIGS. 5A-5C, exemplary views of a mobile computing device selectively displaying different frames of an application user interface in response to a gesture based instruction are shown and described. The application user interface is a static-sized user interface. The frames group information by function: the inbox frame 510 tracks e-mails in the inbox, the message frame 515 displays contents of a selected e-mail, and the "to do" frame 520 tracks appointments. To move from one frame to another, the processor 210b adjusts the horizontal coordinates corresponding to data in the display buffer by the width of a frame. The processor 210b adds or subtracts the width of the frame according to the direction of the adjacent frame.

Figure 6:
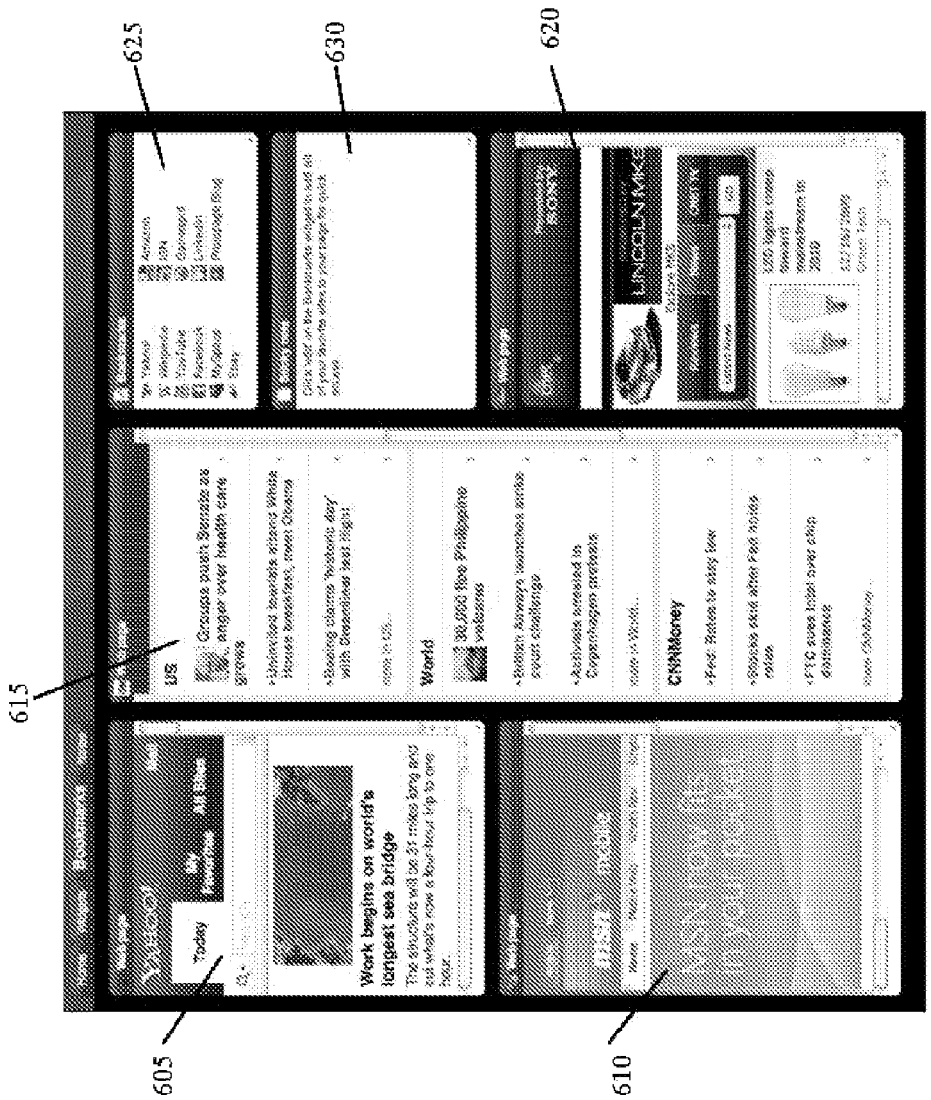
FIG. 6 is a screenshot of an exemplary user interface for panning between applications.

Referring now to FIG. 6, a screenshot of an exemplary user interface for panning between applications is shown and described. In these embodiments, the mobile computing device 102 can adjust the number of applications, positions of the applications, and offsets between adjacent applications when a user closes an application or opens a new application. When a user open an application, the mobile computing device 102 positions the application user interface on the extended virtual screen 230. In some embodiments, the mobile computing device 102 populates the extended virtual screen 230 with user interfaces according to the frames of a predetermined grid. In this manner, the mobile computing device 102 associates applications with frames and uses the horizontal and vertical panning offsets set by the grid.

Further, the mobile computing device 102 can allow a user to change the dimensions of an application user interface or the positions of the applications. For example, the default frame size can be the size of, for example, frame 605. The user can lengthen a frame to the length of frame 615. When the user alters a frame size, the mobile computing device 102 can re-position frames, re-calculate offsets between adjacent frames, and update relationships between frames.

For example, suppose frame 620 had been originally positioned adjacent to frame 610. When a user lengthens a frame to the length of frame 615, as depicted in FIG. 6, the mobile computing device 102 can shift frame 620 to the right on the extended virtual screen 230. The processor 210b updates the memory 250 to indicate that frames 610 and 615 are adjacent to one another and calculates the horizontal panning offset between the frames. The processor 210b deletes associations between frames 610 and 620. Further, the processor 210b updates information about frames 615 and 620 to indicate the frames are adjacent to one another and calculates the horizontal and vertical panning offsets.

Figure 7:
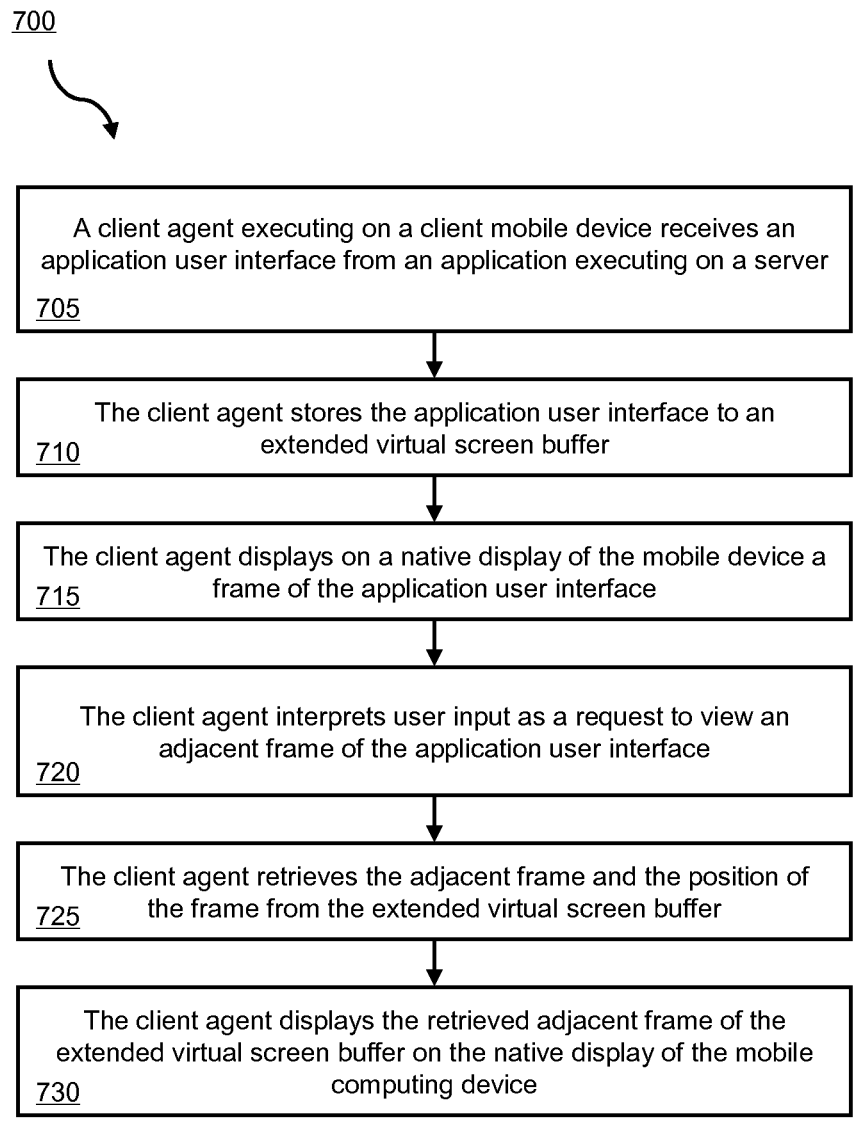
FIG. 7 is a flow diagram that depicts a method for selectively displaying a frame of an application user interface on a mobile computing device.

Section C: Methods for Interpreting a Gesture-Based Instruction to Selectively Display a Frame of an Application User Interface on a Mobile Computing Device Now referring to FIG. 7, is a flow diagram depicting one embodiment of a method 700 for interpreting a gesture-based instruction to selectively display a frame of an application user interface on a mobile computing device. In brief overview, at step 705, a client agent, such as the user interface analyzer 225, executing on a client mobile device receives an application user interface from an application executing on a server. At step 710, the client agent 225 stores the application user interface to an extended virtual screen buffer. At step 715, the client agent 225 displays on a native display of the mobile device a frame of the application user interface. At step 720, the client agent 225 interprets user input as a request to view an adjacent frame of the application user interface. At step 725, the client agent 225 retrieves the adjacent frame and the position of the frame from the extended virtual screen buffer. At step 730, the client agent 225 displays the retrieved adjacent frame of the extended virtual screen buffer on the native display of the mobile computing device.

Still referring to FIG. 7, and in more detail, at step 705, a client agent 225 executing on a client mobile device receives an application user interface from an application executing on a server. A client agent 225 executing on a client mobile device 102 establishes a connection to a session hosted by a server 106. The established connection may be a presentation layer protocol. In some embodiments, the established connection is a virtual channel protocol for remoting the display of the hosted application 215 executing on the server 106. In some embodiments, the client agent 225 connects to an existing proxy session hosted by the server. In some embodiments, the server establishes a new proxy session responsive to the connection request from the client agent 225 of the mobile client device 102. In some embodiments, the client agent 225 receives snapshots of an application user interface from an application 215 executing on the server 106. In some embodiments, the client agent 225 receives user interface data from the server 106. In some embodiments, the client agent 225 receives a plurality of packets representing the user interface data from the hosted application 215 executing on the server 106.

At step 710, the client agent 225 stores the application user interface to an extended virtual screen buffer. In some embodiments, the client agent 225 receives information from the application 215 on the server 106 and stores the received data in cache until the data transmission is complete and then transmits the data to the extended virtual screen buffer. In some embodiments, the client agent 225 receives data, as described herein, from the server and stores the application user interface to an extended virtual screen buffer 230 if the data exceeds the capacity of the display buffer 235. In some embodiments, the client agent 225 receives the application user interface from the hosted application 215 and stores the data directly to an extended virtual screen buffer 230. In some embodiments, the client agent 225 loads a section of the extended virtual screen into a display buffer 235. In some embodiments, the client agent 225 loads multiple sections of the extended virtual screen into the display buffer 235. In some embodiments the client agent 225 may process the received application user interface to identify frames of the user interface, coordinates corresponding to the frames' positions in the extended virtual screen, the relationships between the frames' positions and the offsets to pan from one frame to another. In some embodiments, the user may configure or otherwise specify the relationship of frames. In some embodiments, the relationships between frames may be calculated by the client agent 225 responsive to known user preferences. In some embodiments, the client agent 225 may determine the relationships between frames to mirror the relationship of the frames in the user interface of the desktop application. In some embodiments, the client agent 225 may determine the relationships between frames using rankings of the frames. The rankings of frames may be determined by the manufacture or by depending on usage by the user.

At step 715, the client agent 225 displays on a native display of the mobile device a frame of the application user interface. In some embodiments, the client agent 225 displays a frame specified by the user on the native display of the mobile device. In some embodiments, the native display of the device may be a touchscreen 260. In some embodiments, the application user interface is retrieved from the extended virtual screen 230 and copied to the virtual graphics driver 240 and then applied to a native frame buffer of the mobile device. The native frame buffer transmits the data to the native display 245, such as the touchscreen 260.

At step 720, the client agent 225 interprets user input as a request to view an adjacent frame of the application user interface. In some embodiments, the user input is received from the user via a touchscreen 260. In some embodiments, the user may interact with the touchscreen through gestures, such as a side-swipe or a vertical swipe. In some embodiments, the user may interact with the mobile device 102 using a stylus or other similar tool used in conjunction with mobile devices 102 to enter data. In some embodiments, the client agent 225 receives the user input from a module of the mobile device 102. In some embodiments, the user interface analyzer 225 analyzes the received raw gesture to determine characteristics of the user input, such as direction and velocity. In some embodiments, the characteristics of the user input are received by the user interface analyzer 225 from a module of the mobile computing device 102. In some embodiments, the client agent 225 references a table or other data storage structure to determine an action to apply responsive to the received user input. For example, a horizontal swipe may indicate a request to view a frame to the right or the left of the currently displayed frame. A vertical swipe may indicate a request to view a frame above or below the currently displayed frame. In some embodiments, the characteristics of the user input, such as the location of the gesture on the native display, may indicate scrolling within a frame.

In some embodiments, the client agent 225 may receive a plurality of frames from the server 106. In some embodiments, the application 215 may transmit a single user interface and the client agent 225 may parse or transform received data. In some embodiments, the client agent 225 identifies a plurality of frames of the received application user interface. In some embodiments, the client agent 225 receives coordinates on the extended virtual screen buffer 230 of each of the plurality of frames of the received application user interface. In some embodiments, the client agent 225 calculates coordinates of each of the plurality of frames of the received application user interface on the extended virtual screen buffer. In some embodiments, the user specifies the coordinates of each of the plurality of frames. In some embodiments, the user configures the extended virtual screen buffer 230 to automatically calculate or identify the coordinates of each of the plurality of frames of the received application user interface after analyzing the received frames and determining an efficient layout responsive to the analysis.

In some embodiments, the client agent 225 identifies the panning offsets of each of the plurality of frames of the received application user interface on the extended virtual screen buffer. In some embodiments the client agent 225 uses the characteristics to the native display of the mobile device to determine the panning offsets of the plurality of frames to efficiently use the native display. In some embodiments, the client agent 225 detects jump tags associated with each of the plurality of frames. In some embodiments, the jump tag identifies a command to execute to display a frame if a user inputs the command. In some embodiments, the client agent 225 interprets a vertical swipe from the user as the request to view an adjacent frame of the application user interface as one of above or below the displayed frame. In some embodiments, the client agent 225 applies an object recognition algorithm to the extended virtual screen buffer 230 to identify the plurality of frames of the received application user interface.

At step 725, the client agent 225 retrieves the adjacent frame and the position of the frame from the extended virtual screen buffer. The client agent 225 may determine the dimensions of each of the plurality of frames of the application user interface. In some embodiments, the client agent 225 may retrieve multiple adjacent frames from the extended virtual screen buffer 230 responsive to the velocity of the gesture input received from the user. In some embodiments, the client agent 225 retrieves the frame specified by a jump tag from the current frame. In some embodiments, the client agent 225 communicates with the server-side component to determine that requested adjacent frame contains the most up-to-date information.

At step 730, the client agent 225 displays the retrieved adjacent frame of the extended virtual screen buffer 230 on the native display of the mobile computing device. In some embodiments, the client agent 225 determines to apply a zoom operation to the frame displayed on the native display of the mobile computing device.

In some embodiments, the system may include a client agent 225 used to control the actual user interface positioning features on the mobile device 102 and a server-side component that can be used to gather additional information about the application user interface being delivered to the mobile device 102.

The client agent 225 may be used independent from the server-side component. In some embodiments, the primary function of the client agent 225 is to properly alight the appropriate frame of the larger application user interface on the smaller screen of a device 102 when a control or gesture is used to change the viewable portion of the larger application user interface.

In some embodiments, the client agent 225 may overlay the full graphics buffer of the application with horizontal and vertical view points. In some embodiments, view points are defined as a 0,0 relative pixel offset on the larger user interface of the application 215. The view point is aligned at the 0,0 screen offset of the device 102 when a gesture is made to move to the next grid. In some embodiments, it is necessary to ascertain the user interface grid is currently being displayed on the screen of the device, so that when a gesture is made to pan vertically or horizontally, the user interface can be positioned on the screen 245 based on the next defined vertical or horizontal view point. In some embodiments, view points can also have associated properties that define actions to be performed when that view point is displayed. In some embodiments, an operation is applied to the extended virtual screen 230 to zoom to the center of the application user interface. In some embodiments, the client agent 215 applies a zoom operation to the active grid. The zoom operation may include a zoom-in or a zoom-out by a predetermined percentage to better align the grid on the screen of the mobile computing device 102.

In some embodiments, the viewable portion of the user interface is panned either left or right a defined number of pixels, responsive to a horizontal pan received from a user. In some embodiments, responsive to a vertical pan received from a user, the viewable portion of the user interface is panned either up or down a defined number of pixels. In some embodiments, the defined number of pixels may be set at time of manufacture or configured by a user or administrator of the system.

In some embodiments, static size user interface frames may be used. In some embodiments, the static size may be determined at time of manufacture or configured by an administrator of the system. In some embodiments, the number of pixels to pan vertical or horizontal may be fixed, allowing each frame to be aligned on the screen of the mobile computing device.

In some embodiments, the client agent 225 can be implemented to interrogate the layout of the application 215 being controlled to determine dynamic viewpoints. In some cases, a server side component may also be required to better interrogate the layout of the application being controlled to determine dynamic view points. In some embodiments, the server side component may communicate the client agent 225 to share view points data and other relevant data to allow the client agent 225 to properly pan the application user interface.

In some embodiments, applications requiring highly accurate panning points may communicate with the server side components to ensure that exact view points are defined for the specific application. In some embodiments, the client agent may invoke a move to a new view point responsive to a gesture received from a user.

In some embodiments, the client agent may invoke modules to initiate the navigation operations on different device type. This allows any number of gestures or controls to be used to initiate the navigation operations using usability methods familiar to the users of a certain type of device platform.

Having described certain embodiments of methods and systems for selectively displaying a user interface frame of an application on a mobile computing device, it will now become apparent to one of skill in the art that other embodiments incorporating the concepts of the disclosure may be used. Therefore, the invention should not be limited to certain embodiments.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method of selectively displaying a frame of an application user interface on a mobile computing device, the method comprising:
   receiving, by a client agent of a mobile computing device, an application user interface from an application executing remotely on a server;
   storing, by the client agent, the application user interface to an extended virtual screen buffer maintained by the mobile computing device;
   identifying, by the client agent, a plurality of distinct frames of the application user interface, the plurality of distinct frames including at least:
      a first frame grouping one or more first features of the application user interface, and
      a second frame grouping one or more second features of the application user interface;
   displaying, by the client agent, on a native display of the mobile computing device, the first frame of the plurality of frames of the application user interface;
   interpreting, by the client agent, an input as a request to view a frame adjacent to the first frame; and
   displaying, by the client agent, the second frame on the native display of the mobile computing device.

2. The method of claim 1, comprising:
   querying, by the client agent, an underlying programming object on the server associated with the application user interface for information to identify the plurality of frames of the application user interface.

3. The method of claim 1, comprising:
   identifying, by the client agent, coordinates of each frame of the plurality of frames of the application user interface.

4. The method of claim 1, comprising:
   identifying, by the client agent, for each frame of the plurality of frames, respective horizontal and vertical panning offsets for moving between adjacent frames.

5. The method of claim 1, comprising:
   determining, by the client agent, for each frame of the plurality of frames, a respective orientation for the frame, wherein the orientation is one of a landscape orientation and a portrait orientation.

6. The method of claim 1, comprising:
   determining, by the client agent, dimensions of each frame of the plurality of frames.

7. The method of claim 1, comprising:
   determining, by the client agent, to apply a zoom operation to the first frame.

8. The method of claim 1, comprising:
   detecting, by the client agent, a jump tag identifying a command and associated with at least one frame of the plurality of frames; and
   detecting a destination frame to display when the client agent receives user input selecting the command while the at least one frame associated with the jump tag is displayed by the mobile computing device.

9. The method of claim 1, comprising:
   applying, by the client agent, an object recognition algorithm to the extended virtual screen buffer to identify the plurality of frames of the application user interface.

10. A system for selectively displaying a frame of an application user interface on a mobile computing device comprising:
    a mobile computing device;
    a server;
    an application executing remotely on the server; and
    a client agent executing on a mobile computing device to:
       receive an application user interface from an application executing remotely on the server;
       store the application user interface to an extended virtual screen buffer maintained by the mobile computing device;
       identify a plurality of distinct frames of the application user interface, the plurality of distinct frames including at least:
          a first frame grouping one or more first features of the application user interface, and
          a second frame grouping one or more second features of the application user interface;
       display, on a native display of the mobile computing device, a first frame of the plurality of frames of the application user interface;
       interpret an input as a request to view a frame adjacent to the first frame; and
       display the second frame on the native display of the mobile computing device.

11. The system of claim 10, comprising:
    the client agent executing on the mobile computing device to query an underlying programming object on the server associated with the application user interface for information to identify the plurality of frames of the application user interface.

12. The system of claim 10, comprising:
    the client agent executing on the mobile computing device to identify coordinates of each frame of the plurality of frames of the application user interface.

13. The system of claim 10, comprising:
    the client agent executing on the mobile computing device to identify, for each frame of the plurality of frames, respective horizontal and vertical panning offsets for moving between adjacent frames.

14. The system of claim 10, comprising:
    the client agent executing on the mobile computing device to determine, for each frame of the plurality of frames, a respective orientation for the frame from one of a landscape orientation and a portrait orientation.

15. The system of claim 10, comprising:
    the client agent executing on the mobile computing device to determine dimensions of each frame of the plurality of frames.

16. The system of claim 10, comprising:
    the client agent executing on the mobile computing device to determine to apply a zoom operation to the first frame.

17. The system of claim 10, comprising:
    the client agent executing on the mobile computing device to detect, for at least one frame of the plurality of frames, a respective jump tag identifying a command and a destination frame to display when the client agent receives user input selecting the command while the at least one frame associated with the jump tag is displayed by the mobile computing device.

18. The system of claim 10, comprising:
    the client agent executing on the mobile computing device to apply an object recognition algorithm to the extended virtual screen buffer to identify the plurality of frames of the application user interface.

* * * * *